United States Patent [19]

Handke

[11] Patent Number: 4,930,803
[45] Date of Patent: Jun. 5, 1990

[54] SUSPENSION LEG FOR A MOTOR VEHICLE

[75] Inventor: Günther Handke, Euerbach, Fed. Rep. of Germany

[73] Assignee: Fichtel & Sachs AG, Schweinfurt, Fed. Rep. of Germany

[21] Appl. No.: 250,908

[22] Filed: Sep. 29, 1988

[30] Foreign Application Priority Data

Oct. 16, 1987 [DE] Fed. Rep. of Germany ....... 3735043

[51] Int. Cl.$^5$ ................................................. B60G 3/02
[52] U.S. Cl. ..................................... 280/668; 29/460; 188/322.11; 267/221; 280/673
[58] Field of Search ............... 280/668, 700, 673, 661; 188/322.11; 228/175; 29/458, 436; 248/544, 74.1; 267/217, 221

[56] References Cited

U.S. PATENT DOCUMENTS

| | | | |
|---|---|---|---|
| 3,917,308 | 11/1975 | Schulz | 280/668 |
| 3,937,617 | 2/1976 | Yaguchi | 228/175 |
| 3,972,111 | 8/1976 | Dash | 228/175 |
| 4,321,988 | 3/1982 | Bich | 188/322.11 |
| 4,505,748 | 3/1985 | Baxter | 106/14.12 |
| 4,618,162 | 10/1986 | Specktor et al. | 280/668 |

FOREIGN PATENT DOCUMENTS

| | | | |
|---|---|---|---|
| 83669 | 7/1983 | European Pat. Off. | 280/668 |
| 2932132 | 2/1981 | Fed. Rep. of Germany | 248/74.1 |

*Primary Examiner*—Charles A. Marmor
*Assistant Examiner*—Eric Culbreth
*Attorney, Agent, or Firm*—Brumbaugh, Graves, Donohue & Raymond

[57] ABSTRACT

In a suspension leg for a motor vehicle a bracket surrounds the lower end of the container on a major part of the circumference thereof. Two legs of the bracket define a gap between each other adjacent to the container. A U-shaped insert member is inserted into the gap. An interspace is defined between the bottom of the U-shaped insert and the container. This interspace is dimensioned such that it can be subjected to a surface treatment such as phosphatizing or varnishing.

17 Claims, 1 Drawing Sheet

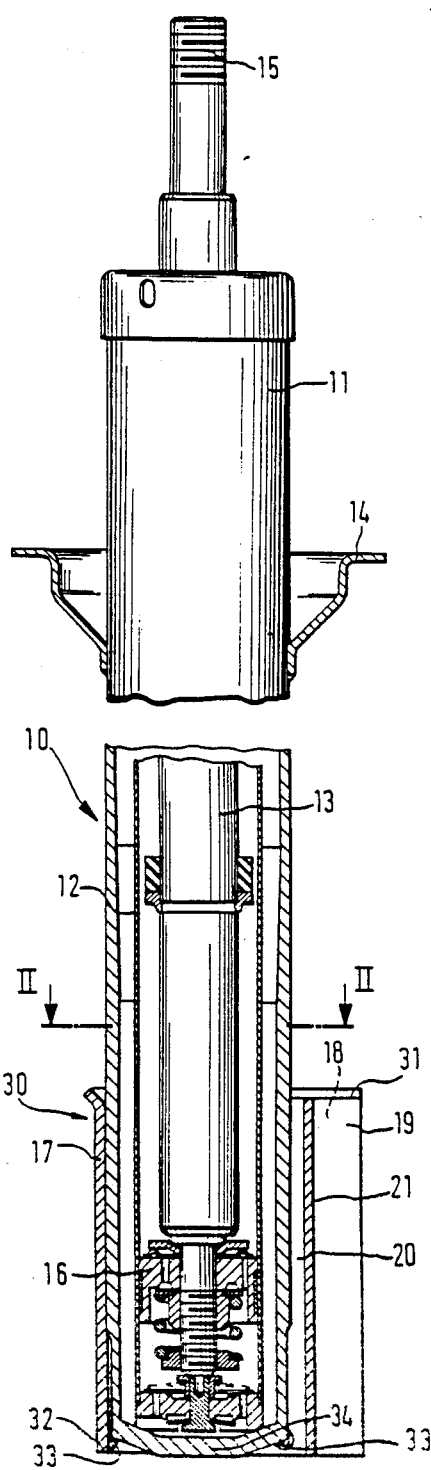
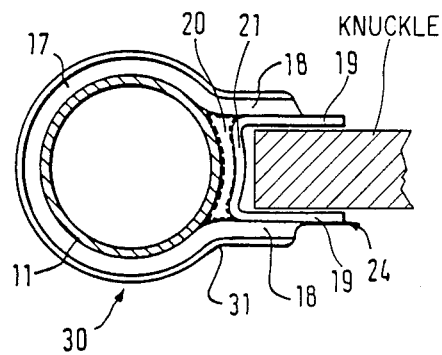
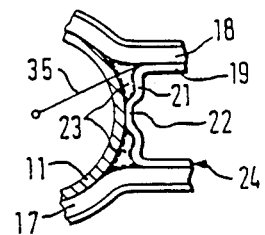

SUSPENSION LEG FOR A MOTOR VEHICLE

BACKGROUND OF THE INVENTION

Suspension legs are frequently used for carrying wheels of a vehicle. These suspension legs are during operation of the vehicle subjected to atmospheric influences. They are therefore provided with corrosion-resistant coatings.

A frequently used type of suspension legs comprises a bracket at the lower end of the leg. This bracket surrounds a major part of the circumference of the container of the suspension leg and has two terminal portions which define a gap therebetween. In this gap there is inserted a U-shaped insert such that the steering knuckle can be inserted within the gap between the side portions of the U-shaped insert member. The bottom portion of the U-shaped insert member is accordingly adjacent to a wall portion of the container member. Between this bottom portion and the container member interspaces can occur in which water can collect. This water can attack the metallic material of the suspension leg.

OBJECT OF THE INVENTION

It is an object of the present invention to provide a suspension leg in which the risk of corrosive damages in the area between the container member and the bottom portion of the U-shaped insert is reduced.

SUMMARY OF THE INVENTION

A suspension leg for a motor vehicle comprises a container member having an axis and two ends. Shock absorber means are housed within the container member and a piston rod of the shock absorber means passes in axial direction through one of the ends. Connection means are provided on the container member adjacent to the other of the two ends, which connection means are adapted for connecting a steering knuckle to the container member. These connection means comprise a bracket having a collar portion surrounding the container member over a major part of the circumference thereof. Two substantially parallel terminal leg portions of the bracket define with respective inner side faces a gap adjacent the container. A substantially U-shaped insert member is inserted into the gap. This U-shaped insert member has a bottom portion and two side portions. The bottom portion is adjacent to the container member within the gap and the side portions are attached to the inner side faces of the terminal leg portions. Interspace confining face portions of the bottom portion, the container member and the inner side faces of the terminal legs confine at least one interspace. This interspace when regarded in an axial direction has a cross-sectional area such that the interspace confining face portions are accessible to an anticorrosion surface treatment such as phosphatizing or electrophoretic coating. Thus, the interspace confining face portions can be easily provided with an anticorrosion surface layer such as a phosphatized layer and/or a varnished layer. This layer can be obtained during the normal anticorrosion treatment of the remaining freely accessible surface portions of the suspension leg.

The cross-sectional dimension of the interspace according to this invention does not only allow the provision of an anticorrosion layer on the interspace confining face portions but also permits water to flow off from the interspaces.

According to a first embodiment, the bottom portion of the U-shaped insert member has a substantially constant distance from the container member in a plane perpendicular to the axial direction, one single interspace being defined between the bottom portion and the container member. In this embodiment, the interspace can have a substantially constant width of at least about 1.5 mm, preferably of at least about 2 mm.

According to a second embodiment, the bottom portion of the insert member has a central projection towards the container member and engages the container member. Two substantially triangular interspaces are provided on both sides of the central projection between the container member, the bottom portion and the inner side faces of the terminal leg portions. These interspaces may have along a radial line with respect to the axial direction a height of at least about 2 mm, preferably of at least about 3 mm.

The collar portion may be welded to the container member adjacent the other end thereof along respective peripheries of the container member and the collar portion. The side portions of the insert member may be fastened to the terminal leg portions by spot welding or projection welding.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings, in which:

FIG. 1 is a side view partially in longitudinal section of a suspension leg for a motor vehicle;

FIG. 2 is a cross-section according to line II—II of FIG. 1, according to a first embodiment of the invention; and FIG. 3 is a section corresponding to FIG. 2 with a second embodiment of the invention.

DESCRIPTION OF THE PREFERRED EMBODIMENTS

The suspension leg 10 shown in FIG. 1 comprises a shock absorber 12 with a container tube 11. A piston rod 13 of the shock absorber 12 extends inwards and outwards of the upper end of the container tube 11. A piston unit 16 is fastened to the inner end of the piston rod 13 and is provided with damping means. The upper end of the piston rod 13 is provided with a threaded pin 15 for fastening the suspension leg to the vehicle body. A spring support cup 14 is welded to the container tube 11 for supporting a compression spring (not shown).

At the lower end of the container tube 11 a bracket 30 is provided. This bracket 30 comprises a collar portion 17 surrounding the container tube 11 along a circumferential angle of 360 degrees minus about 60 to 90 degrees. The collar portion 17 is continued by terminal leg portions 18 which define a gap between each other, which gap is open towards the container tube 11. The collar portion 17 is provided with a funnel-shaped reinforcement rib 31. The lower edge 32 of the collar portion 17 is welded by a welding seam 33 to a bottom 34 of the container tube 11. A U-shaped insert member 24 is inserted into the gap between the terminal leg portions 18 of the bracket 30. The side portions 19 of the insert member are fastened to the leg portions 18 by spot or projection welding. The bottom portion 21 of the U-shaped insert member 24 is adjacent to the container tube 11; there is, however, defined an interspace 20 by interspace confining face portions of the container tube 11, the bottom portion 21 and the terminal leg portions 18. These interspace confining face portions are indicated in FIG. 2 by dotted lines. These interspace confining face portions are surface-treated by phosphatizing and/or varnishing. The radial dimension of the interspace 20 is larger than about 1.5 mm.

The interspace 20 is large enough in cross-sectional area that the dotted interspace confining face portions can be easily treated by corrosion-resistant surface treatments when such surface treatments are applied to the overall surface of the suspension leg. Water cannot collect within the interspace 20, because this interspace 20 is open in downward direction.

In accordance with FIG. 2, the radius of curvature of the bottom portion 21 substantially corresponds to the radius of curvature of the container tube 11.

The embodiment of FIG. 3 is useful as a heavy-load construction. The bottom portion 21 of the insert member 24 is provided with a central projection 22 towards the container tube 11 and engages the container tube 11. The projection 22 is welded to the container tube 11. The interspaces 23 are again defined by interspace confining face portions which are indicated by dotted lines. These face portions are phosphatized and varnished. The interspaces 23 have a substantially triangular cross-sectional configuration. Along a radial line indicated by 35 the height of these triangular interspaces is at least about 2 mm, preferably about 3 mm. Thus, the interspaces 23 are again accessible to anticorrosion surface treatment and permit water to freely flow off in downward direction.

It is to be noted that the steering knuckle is inserted between the side portions 19 of the insert member 24 and that holes are provided in the side portions 19 and the terminal leg portions 18 such that fastening bolts can be inserted into said holes and through corresponding holes of a mounting flange of said steering knuckle.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A suspension leg (10) for a motor vehicle, comprising a container member (11) having an axis and two ends, shock absorber means (12) being housed within said container member (11), a piston rod (13) of said shock absorber means (12) passing in an axial direction through one of said ends, connection means (30, 24) being provided on said container member (11) adjacent the other of said two ends, said connection means (30, 24) being adapted for connecting a steering knuckle to said container member (11) and comprising a bracket (30) having a collar portion (17) surrounding said container member (11) over a major part of the circumference thereof, and two substantially parallel terminal leg portions (18) with respective inner side faces defining a gap therebetween, said connection means (30, 24) further comprising a substantially U-shaped insert member (24) inserted into said gap, said U-shaped insert member (24) having a bottom portion (21) and two side portions (19) with said bottom portion (21) being adjacent to said container member (11) within said gap and with said side portions (19) being attached to said inner side faces of said terminal leg portions (18), interspace confining face portions (dotted) of said bottom portion (21), said container member (11) and said inner side faces confining at least one interspace (20), said at least one interspace (20) when regarded in said axial direction having a cross-sectional area such that said interspace confining face portions (dotted) are accessible to an anticorrosion surface treatment, said bottom portion (21) having along its total length thereof a distance from said container member (11) in a plane perpendicular to said axial direction, one single interspace (20) being defined between said bottom portion (21) and said container member (11).

2. A suspension leg according to claim 1, said bottom portion (21) having a substantially constant distance from said container member (11) in a plane perpendicular to said axial direction.

3. A suspension leg according to claim 2, said interspace (20) having a substantially constant width of at least 1.5 mm.

4. A suspension leg according to claim 3, said width being at least 2 mm.

5. A suspension leg (10) for a motor vehicle, comprising a container member (11) having an axis and two ends, shock absorber means (12) being housed within said container member (11), a piston rod (13) of said shock absorber means (12) passing in axial direction through one of said ends, connection means (30, 24) being provided on said container member (11) adjacent the other of said two ends, said connection means (30, 24) being adapted for connecting a steering knuckle to said container member (11) and comprising a bracket (30) having a collar portion (17) surrounding said container member (11) over a major part of the circumference thereof, and two substantially parallel terminal leg portions (18) with respective inner side faces defining a gap therebetween, said connection means (30, 24) further comprising a substantially U-shaped insert member (24) inserted into said gap, said U-shaped insert member (24) having a bottom portion (21) and two side portions (19) with said bottom portion (21) being adjacent to said container member (11) within said gap and with said side portions (19) being attached to said inner side faces of said terminal leg portions (18), interspace confining face portions (dotted) of said bottom portion (21), said container member (11) and said inner side faces confining at least one interspace (20), said at least one interspace (20) when regarded in said axial direction having a cross-sectional area such that said interspace confining face portions (dotted) are accessible to an anticorrosion surface treatment, said bottom portion (21) having a central projection (22) towards said container member (11) and engaging said container member (11), two substantially triangular interspaces (23) being defined by both sides of said central projection (22) between said container member (11) and the faces of said bottom portion (21) facing said container member (11) and said terminal leg portions (18) facing said container member (11), said projection (22) having a contact face in engagement with said container member (11) which contact face extends in circumferential direction about said axis over less that 50% of a circumferential length of an external surface of said container member (11) between said side portions (19).

6. A suspension leg according to claim 5, said interspaces (23) having along a radial line (35) with respect to said axial direction a dimension of at least 2 mm.

7. A suspension leg (10) for a motor vehicle, comprising a container member (11) having an axis and two ends, shock absorber means (12) being housed within said container member (11), a piston rod (13) of said shock absorber means (12) passing in axial direction through one of said ends, connection means (30, 24) being provided on said container member (11) adjacent the other of said two ends, said connection means (30, 24) being adapted for connecting a steering knuckle to said container member (11) and comprising a bracket (30) having a collar portion (17) surrounding said container member (11) over a major part of the circumference thereof, and two substantially parallel terminal leg portions (18) with respective inner side faces defining a gap therebetween, said connection means (30, 24) further comprising a substantially U-shaped insert member (24) inserted into said gap, said U-shaped insert member (24) having a bottom portion (21) and two side portions (19) with aid bottom portion (21) being adjacent to said container member (11) within said gap and with said side portions (19) being attached to said inner side faces of said terminal leg portions (18), interspace confining face portions (dotted) of said bottom portion (21), said container member (11) and said inner side faces confining at least one interspace (20) said at least one interspace (20) when regarded in said axial direction having a cross-sectional area such that said interspace confining face portions (dotted) are accessible to an anticorrosion surface treatment, said bottom portion (21) having a central projection (22) towards said container member (11) and engaging said container member (11), two substantially triangular interspaces (23) being defined by both sides of said central projection (22) between said container member (11) and the faces of said bottom portion (21) facing said container member (11) and said terminal leg portions (18) facing said container member (11), said projection (22) having a contact face in engagement with said container member (11) which contact face extends in circumferential direction about said axis over less that 50% of a circumferential length of an external surface of said container member (11) between said side portions (19), said interspaces (23) having along a radial line (35) with respect to said axial direction a dimension of at least 2 mm.

8. A suspension leg according to any one of claims 1, 5 or 7 said interspace confining face portions being provided with an anticorrosion surface layer.

9. A suspension leg according to claim 8, said anticorrosion layer being part of an overall anticorrosion layer provided on accessible surface portions of said suspension leg (10).

10. A suspension leg according to claim 8, in which said anticorrosion surface layer is selected from the group consisting of a phosphatized layer and an electrophoretic coating.

11. A suspension leg according to claim 8, in which said anticorrosion surface layer is selected from the group consisting of a phosphatized layer, a varnished layer, and a combination thereof.

12. A suspension leg according to either claim 7 or claim 6, said dimension being at least 3 mm.

13. A suspension leg according to any one of claims 1, 5 or 7 said collar portion (17) being welded to said container member (11) adjacent said other end thereof along respective peripheries of said container member (11) and said collar portion (17).

14. A suspension leg according to any one of claims 1, 5 or 7, said side portions (19) being fastened to said terminal leg portions (18) by spot welding.

15. A suspension leg according to either claim 5 or claim 7, said central projection (22) being spot welded to said container member (11).

16. A suspension leg according to either claim 5 or claim 7, said central projection (22) being projection welded to said container member (11).

17. A suspension leg according to any one of claims 1, 5 or 7, said side portions (19) being fastened to said terminal leg portions by means of projection welding.

* * * * *

UNITED STATES PATENT AND TRADEMARK OFFICE
CERTIFICATE OF CORRECTION

PATENT NO. : 4,930,803

DATED : June 5, 1990

INVENTOR(S) : Gunther Handke

It is certified that error appears in the above-identified patent and that said Letters Patent is hereby corrected as shown below:

First page, Col. 2, line 6, "2932132" should read --29 32 138--;
Col. 5, line 2, "that" should read --than--;
Col. 5, line 26, "aid" should read --said--;
Col. 6, line 4, "that" should read --than--;
Col. 6, line 10, after "7" insert a comma.

Signed and Sealed this

Eighth Day of October, 1991

Attest:

HARRY F. MANBECK, JR.

Attesting Officer

Commissioner of Patents and Trademarks